United States Patent [19]

Carosello

[11] 4,131,543
[45] Dec. 26, 1978

[54] METHOD OF ABSORBING LIQUIDS USING A PREPARATION OF EXPANDED SILICATE-BASED AGGREGATES

[75] Inventor: Theodore F. Carosello, Painesville, Ohio

[73] Assignee: Progressive Research Products, Inc., Painesville, Ohio

[21] Appl. No.: 832,422

[22] Filed: Sep. 12, 1977

Related U.S. Application Data

[63] Continuation-in-part of Ser. No. 751,260, Dec. 17, 1976, abandoned, and a continuation-in-part of Ser. No. 796,970, May 16, 1977, abandoned.

[51] Int. Cl.$^2$ .............................................. C02B 9/02
[52] U.S. Cl. ........................................ 210/36; 134/6; 210/40; 210/DIG. 26
[58] Field of Search ........... 210/21, 242, 36, DIG. 26, 210/39, 24, 41; 106/40 R, 75; 134/6

[56] References Cited

U.S. PATENT DOCUMENTS

| | | | |
|---|---|---|---|
| 3,719,510 | 3/1973 | Temple et al. | 106/40 R |
| 3,887,671 | 6/1975 | Metzger | 106/40 R |
| 3,947,363 | 3/1976 | Pryor et al. | 106/40 R |

Primary Examiner—Charles N. Hart
Assistant Examiner—E. Rollins Cross
Attorney, Agent, or Firm—Baldwin, Egan, Walling & Fetzer

[57] ABSTRACT

This invention presents a preparation of expanded silicate-based aggregates as useful in a method for absorbing hazardous liquid materials. This expanded silicate-based aggregate material has previously been known for use as insulation, fireproof wallboard and insulating blocks, high temperature pipe covering, fire proofing of steel structures, marine deck filler and for cement block in non-bearing fire walls, but not for absorbing hazardous liquids. The present invention uses this aggregate material, either alone or mixed with a solution of five to seven percent of polyvinyl chloride in a solvent comprising 15% dimethylsulfoxide and 85% methylethyl ketone providing a paste which may be placed on a hazardous liquid material and within seconds will absorb the hazardous material throughout the thick paste material.

5 Claims, No Drawings

METHOD OF ABSORBING LIQUIDS USING A PREPARATION OF EXPANDED SILICATE-BASED AGGREGATES

This application is a continuation-in-part of my U.S. application Ser. No. 751,260 filed Dec. 17, 1976, now abandoned, and of my copending U.S. application Ser. No. 796,970, filed May 16, 1977, now abandoned.

BACKGROUND OF THE INVENTION

There is a great need today for a finely divided material for absorbing hazardous liquids such as nitric and hydrochloric acids, methylethyl ketone, and other ketones, xylene, polychlorinated bis phenol (PCB) and slurries thereof in gel form, crude petroleum oils, bunker fuel oil, refined fuels such as gasoline and fuel oils, common solvents, and similar hazardous materials.

This invention uses a preparation of expanded silicate-based aggregates described in U.S. Pat. No. 3,719,510 granted Mar. 6, 1973 to Ralph E. Temple, and William T. Gooding, Jr. and assigned to Diamond Shamrock Corporation of Cleveland, Ohio. This aggregate material of U.S. Pat. No. 3,719,510 has previously been used only as loose insulation, fireproof wallboard, and insulating blocks, pipe covering for high temperatures, ceiling tiles, fireproof cladding of steel structures, filler for marine decks, cement blocks for non-bearing fire walls and similar structural uses. The present invention presents the discovery of this silicate-based aggregate as a highly efficient material for picking up and absorbing hazardous liquid materials, as to which there is an unfilled need at present.

The present invention utilizes this expanded silicate-based aggregate material for contacting hazardous liquid materials such as nitric and hydrochloric acids, methylethyl ketone and other ketones, xylene, polychlorinated bis phenol in gel form, crude petroleum oils, bunker fuel oil, refined fuels such as gasoline and fuel oils, common solvents and other similar hazardous materials which are often spilled from tanks and other containers creating a dangerous situation. This expanded silicate-based aggregate is described and claimed in U.S. Pat. No. 3,719,510 granted Mar. 6, 1973 to Ralph E. Temple and William T. Gooding, Jr. and assigned to Diamond Shamrock Corporation of Cleveland, Ohio. This insoluble aggregate is formed by:

(A) mixing, at a temperature less than boiling, an aqueous alkali metal silicate having an alkali metal oxide:silicon dioxide weight ratio of from about 1:3.0–7.0 with an essentially anhydrous alkali metal silicate within the same weight ratio range, the amount of anhydrous added being that quantity sufficient to give, in combination with the aqueous, a total alkali metal silicate solids content of from 80–40% by weight and the amount of alkali metal silicate solids being 40–90% by weight, dry basis, of the total resultant aggregate;

(B) admixing prior to the time when the anhydrous alkali metal silicate becomes substantially hydrated, two insolubilizing compounds as follows;

(1) a primary insolubilizer capable of reacting with the alkali portion of the alkali metal silicate at temperatures less than boiling, the amount used being that sufficient to reduce hygroscopicity of the silicate to the point where caking of the composition prior to expansion but subsequent to grinding is prevented and (2) a secondary insolubilizer capable of reacting with the silicate portion of the alkali metal silicate at temperatures used in expanding same, the amount used being that sufficient to render the expanded aggregate water-insoluble, the total amount of insolubilizers used being less than the stoichiometric amount required for total reaction with the alkali metal silicate present;

(C) continuing mixing until the components will not separate on standing at temperatures up to boiling;

(D) curing the mixed composition at temperatures up to boiling until the anhydrous alkali metal silicate has become substantially hydrated and the primary insolubilizer reacted;

(E) cooling the composition to a grindable solid;

(F) grinding the composition into discrete nonadherent particles suitable for expansion and (G) rapidly expanding the particles and causing the secondary solubilizer to react by exposure to temperatures of from about 800°–1800° F. to provide an insoluble light weight aggregate which is free flowing in small clusters, having an average density in loose bulk of 2.5 to 3.5 pounds per cubic foot, and having a water absorption of 1.5 gallons per cubic foot, and this insoluble light weight aggregate being sized substantially through a screen 10 meshes per inch in two directions. This material when used as taught in this invention will absorb the hazardous liquid materials at about 10 to 15 times its weight.

This expanded silicate-based aggregate material, consisting of fines and up to everything which passes the 10 mesh screen may be used dry for absorbing hazardous liquid materials, or may be mixed with a polyvinyl chloride slurry as described below.

When mixed with a slurry the aggregate material is subjected to the following step:

(1) Pour into starting material a mass of said fine silicate-based dry aggregate material produced as taught in U.S. Pat. No. 3,719,510 and screened through 10 mesh screen, a slurry consisting of a solution at a temperature of 150° F. to 165° F., of five to seven percent polyvinyl chloride in a solvent comprising 15% dimethylsulfoxide and 85% methylethyl ketone to provide a paste which may be of a consistency of a paint intended for brush application or it may be like a stiff paste, substantially saturated with said silicate-based aggregate. No water is permitted in the solvent used for this slurry. The starting material of silicate-based aggregate may be at any temperature up to about 165° F. Food grade PVC powder is used and it is mechanically stirred sufficiently to keep the PVC material from sticking and burning. When said slurry equals from about 18 percent to about 25 percent by weight of said starting material, and said slurry batch changes from a white color to a gray color, then one knows that the slurry material is saturated with the silicate-based aggregate. The higher percent of slurry is related to an aggregate material higher in fines.

The above described thick paste material may be prepared ahead of time and stored in air-tight containers, or such thick paste may be mixed on a spill-recovery vehicle, such as a boat or a truck, and then applied directly on the hazardous liquid material of the spill. Where the spill is floating on water, contact with the water congeals or agglomerates the stiff paste of the mix, instantly driving off the solvents. Where the spill is on dry land, the stiff paste will quickly absorb the hazardous liquid, and usually there is sufficient moisture in the air to cause the stiff paste absorbing material to agglomerate rather quickly. In any case, the absorbing material of this invention is readily harvested after it has absorbed the hazardous liquid material.

For use of this invention where longer storage time is needed, the stiff paste material of this invention is further treated as follows:

(2) Drop the stiff paste, so formed, into a salt or fresh water bath, of any temperature, usually from ambient temperature on up, which does a better job than spraying the water on the stiff paste;

(3) The contact with water congeals or agglomerates the stiff paste instantly driving off the solvents;

(4) Then heat or air dry the resulting mats or blocks of the congealed stiff paste at a temperature between about 150° F. to about 200° F. for about 45 to 60 minutes.

(5) Then the mats or blocks may be sized as desired although any size of mat or block will absorb hazardous liquid materials as described herein.

The mats or blocks of this material, either formed by step 1 or by added steps 2 through 5, may be distributed on spilled liquids either on floors or roads, or on water where hazardous liquids float. The material may be distributed by use of a commonly known hay blower such as is used to cover grass seed on road sides. These machines are a combined chopper and blower and this could chop up the mats formed by this invention, if desired.

The mats or blocks of this invention may be contained in mesh pillows or booms or other containers, if desired. The aim of course is to render any spill of hazardous fluid harmless as soon as possible. Thus the pillows or booms are placed around the spill as the first step in picking up the spill. One should recognize that one could drop the material of this invention from an airplane upon a hazardous liquid floating on water when the water is violent. The material of this invention has been contacted by a very large number of known hazardous materials and none of them will attack or dissolve the dried mats or blocks of this invention. Therefore, any booms or pillows will hold the material as long as desired. A nylon mesh is popular for booms and pillows but polypropylene is not attached by hardly any of the hazardous materials which are contemplated.

The material formed by use of this invention as hereinabove described, either in step 1, or by additional steps 2 through 5, when placed in contact with a hazardous liquid material will absorb the hazardous material throughout the mats or blocks, regardless of their thickness, usually within seconds. A block nine inches high, standing in crude oil less than one-half inch deep at room temperature, absorbed crude oil throughout its length in one hour.

The starting material of this invention which is the dry insoluble lightweight aggregate sized by passing it through screens of 10 meshes per inch in two directions is effective, in that state, for recovering hazardous materials. It would however be difficult to pick up the very fine material thus described in any efficient manner, and there would be a dust problem in spreading the dry aggregate material on a spill. However, the mats and blocks of the present invention lend themselves to very easy recovery, especially when floating on water. The present invention assures that, after mixing with the polyvinyl chloride slurry, all of the dusty material in the starting aggregate is tied down in the paste or the mats and blocks so that it does not pollute the air and is not hazardous to the workers applying the same to the hazardous liquid.

The material of this invention will absorb hazardous liquid materials at about 10 to 15 times the weight of the dry light aggregate material described herein, either alone or mixed with a slurry of polyvinyl chloride mixed with dimethylsulfoxide and methylethyl ketone to form a paste or as mats or blocks, as described. This compares with the use of vermiculite in collecting spilled hazardous liquids which absorb about two times the weight of the vermiculite as recovered hazardous liquid. It is more efficient than perlite which recovers about five times its weight of hazardous liquid. The present invention provides a hazardous liquid recovery material which is cheaper than most materials presently on the market and offered for this purpose.

It should be understood that the various numbered steps set forth in this invention for providing the insoluble lightweight aggregate of this invention either as used alone, or as made into a paste by mixing a binder consisting of 5% to 7% of PVC dissolved in a solvent consisting of 15% DMSO and 85% MEK, is preferably provided in a continuous operation, either including the step 1, or including steps 1 through 5 hereinabove set forth, rather than as a batch process.

While the described polyvinyl chloride slurry is a prepared binder for the basic light weight aggregate material, to eliminate the dust problem, because it does not block the open pores of such basic material, other binders may be used such as waxes, oil, acrylic or other plastic polymers.

What is claimed is:

1. A method of absorbing a spill on land of hazardous, liquid materials chosen from the group consisting of nitric acid, hydrochloric acid, methyl ethyl ketone, other ketones, xylene, polychlorinated bis phenol, known as PCB, slurries thereof in gel form, crude petroleum oils, bunker fuel oil, gasoline, fuel oils, common solvents, and similar hazardous materials, consisting of taking an expanded insoluble light weight aggregate material formed by:

(A) mixing, at a temperature less than boiling, an aqueous alkali metal silicate having an alkali metal oxide: silicon dioxide weight ratio of from about 1:3.0–7.0 with an essentially anhydrous alkali metal silicate within the same weight ratio range, the amount of anhydrous added being that quantity sufficient to give, in combination with the aqueous, a total alkali metal silicate solids content of from 80–40% by weight and the amount of alkali metal silicate solids being 40–90% by weight, dry basis, of the total resultant aggregate;

(B) admixing, prior to the time when the anhydrous alkali metal silicate becomes substantially hydrated, two insolubilizing compounds as follows:

(1) a primary insolubilizer capable of reacting with the alkali portion of the alkali metal silicate at temperatures less than boiling, the amount used being that sufficient to reduce hygroscopicity of the silicate to the point where caking of the composition prior to expansion but subsequent to grinding is prevented and (2) a secondary insolubilizer capable of reacting with the silicate portion of the alkali metal silicate at temperatures used in expanding same, the amount used being that sufficient to render the expanded aggregate water-insoluble, the total amount of insolubilizers used being less than the stoichiometric amount required for total reaction with the alkali metal silicate present;

(C) continuing mixing until the components will not separate on standing at temperatures up to boiling;

(D) curing the mixed composition at temperatures up to boiling until the anhydrous alkali metal silicate has become substantially hydrated and the primary insolubilizer reacted;

(E) cooling the composition to a grindable solid;

(F) grinding the composition into discrete nonadherent particles suitable for expansion and (G) rapidly expanding the particles and causing the secondary solubilizer to react by exposure to temperatures of from about 900°–1800° F., to provide an insoluble light weight aggregate which is free flowing in small clusters, having an average density in loose bulk of 2.5 to 3.5 pounds per cubic foot, and having a water absorption of 1.5 gallons per cubic foot, said insoluble light weight aggregate being sized at substantially 10 meshes per inch, then spread this light weight aggregate material over said spill thick enough to absorb said hazardous material.

2. The method as defined in claim 1, including the additional steps wherein said light weight aggregate material at any temperature up to 165° F. is then mixed with a binder consisting of 5% to 7% polyvinyl chloride dissolved in a solvent free of water and consisting of 15% dimethylsulfoxide and 85% methylethyl ketone at a temperature of about 150° F. to 165° F., until the saturated condition of the mixture turns it from white to gray, while mechanically stirring such mixture, thus forming a final mixture varying in thickness from that of a paint prepared for brush application to a thick paste, and then applying said final mixture to the hazardous liquid material to be absorbed, which absorption occurs in a matter of seconds after contact of the final mixture with the hazardous liquid, the final mixture absorbing said hazardous liquid materials at a rate about 10 to 15 times its weight.

3. The method of claim 1, wherein said final mixture of aggregate material with said binder is like a thick paste and is submitted to the following steps:

(A) passing the said thick paste through contact with salt or fresh water at any temperature, whereby the contact with the water congeals or agglomerates the thick paste instantly into mats or blocks driving off the solvents, and (B) then heating or air drying the resulting mats and blocks at about 150° F. to 200° F. for 45 to 60 minutes, after which said mats and blocks are applied to spills of hazardous liquid materials to absorb same.

4. The method as defined in claim 1, including the additional steps wherein said light weight aggregate material is then mixed with between 20 percent and 40 percent of its weight of a slurry consisting of 5% to 7% of polyvinyl chloride dissolved in a solvent free of water and consisting of 15% dimethylsulfoxide and 85% methylethyl ketone at a temperature of about 150° F. to 165° F.

5. The method as defined in claim 1, including the additional steps wherein said light weight aggregate material at any temperature up to 165° F. is then mixed with a binder comprising waxes, or oils, or acrylic or other plastic polymers while mechanically stirring such mixture, thus forming a final mixture varying in thickness from that of a paint prepared for brush application to a thick paste, and then applying said final mixture to the hazardous liquid material to be absorbed, which absorption occurs in a matter of seconds after contact of the final mixture with the hazardous liquid, the final mixture absorbing said hazardous liquid materials at a rate about 10 to 15 times its weight.

* * * * *